United States Patent
Akamatsu

(10) Patent No.: US 8,307,931 B2
(45) Date of Patent: Nov. 13, 2012

(54) SENSOR-EQUIPPED AXLE UNIT HAVING A BUILT-IN MOTOR OF IN-WHEEL TYPE

(75) Inventor: Yoshinobu Akamatsu, Iwata (JP)

(73) Assignee: NTN Corporation, Osaka (JP)

( * ) Notice: Subject to any disclaimer, the term of this patent is extended or adjusted under 35 U.S.C. 154(b) by 682 days.

(21) Appl. No.: 12/311,109

(22) PCT Filed: Aug. 29, 2007

(86) PCT No.: PCT/JP2007/000930
§ 371 (c)(1),
(2), (4) Date: Mar. 19, 2009

(87) PCT Pub. No.: WO2008/035455
PCT Pub. Date: Mar. 27, 2008

(65) Prior Publication Data
US 2009/0236157 A1     Sep. 24, 2009

(30) Foreign Application Priority Data
Sep. 19, 2006   (JP) ................................. 2006-252531

(51) Int. Cl.
*B60K 1/00* (2006.01)
(52) U.S. Cl. .................................. 180/65.51; 180/65.27
(58) Field of Classification Search ............... 180/65.51, 180/65.285, 65.6
See application file for complete search history.

(56) References Cited

U.S. PATENT DOCUMENTS

| | | | | |
|---|---|---|---|---|
| 5,014,800 A | * | 5/1991 | Kawamoto et al. | 180/65.51 |
| 5,087,229 A | * | 2/1992 | Hewko et al. | 475/149 |
| 5,127,485 A | * | 7/1992 | Wakuta et al. | 180/65.51 |
| 5,633,544 A | * | 5/1997 | Toida et al. | 310/67 R |
| 5,691,584 A | * | 11/1997 | Toida et al. | 310/67 R |
| 6,386,553 B2 | * | 5/2002 | Zetterstrom | 280/5.51 |
| 6,494,278 B1 | * | 12/2002 | Weisz | 180/65.51 |
| 6,768,932 B2 | * | 7/2004 | Claypole et al. | 700/279 |
| 6,863,141 B2 | * | 3/2005 | Weisz | 180/65.51 |
| 7,059,437 B2 | * | 6/2006 | Heinen | 180/65.51 |
| 7,125,023 B2 | * | 10/2006 | Cho | 280/5.502 |

(Continued)

FOREIGN PATENT DOCUMENTS

JP          5-332401          12/1993

(Continued)

OTHER PUBLICATIONS

International Search Report for International Application No. PCT/JP2007/000930, mailed Dec. 4, 2007.

(Continued)

*Primary Examiner* — Jeffrey J Restifo

(57) ABSTRACT

A sensor equipped axle unit having an in-wheel type motor built therein, in which a hub bearing assembly (A), an electric motor (B), a reduction gear unit (C) and a brake assembly (D) are arranged coaxially on a center axis of a vehicle drive wheel. Sensors (80, 81 and 82) are provided for measuring forces Fx, Fy and Fz acting at a point of contact of the vehicle drive wheel (70) and a road surface in three axis directions perpendicular to each other, respectively, from the status of at least one of the hub bearing assembly (A), the electric motor (B), the reduction gear unit (C) and the brake assembly (D). Results of such measurement are utilized for a suspension control, an ABS control and any other control.

9 Claims, 12 Drawing Sheets

U.S. PATENT DOCUMENTS

| | | | |
|---|---|---|---|
| 7,273,115 B2 * | 9/2007 | Kummer et al. | 180/19.1 |
| 7,423,393 B2 | 9/2008 | Wakao et al. | |
| 7,520,183 B2 | 4/2009 | Kouduki et al. | |
| 7,530,415 B2 * | 5/2009 | Heinen | 180/65.51 |
| 7,597,169 B2 * | 10/2009 | Borroni-Bird et al. | 180/253 |
| 7,630,807 B2 | 12/2009 | Yoshimura et al. | |
| 7,673,883 B2 * | 3/2010 | Damm | 280/5.521 |
| 7,938,210 B2 * | 5/2011 | Kunzler et al. | 180/65.51 |
| 7,938,218 B2 * | 5/2011 | Howell et al. | 180/197 |
| 7,958,959 B2 * | 6/2011 | Yogo et al. | 180/65.51 |
| 2001/0030400 A1 | 10/2001 | Zetterstrom | |
| 2003/0230443 A1 * | 12/2003 | Cramer et al. | 180/65.5 |
| 2005/0274560 A1 | 12/2005 | Wakao et al. | |
| 2006/0015231 A1 | 1/2006 | Yoshimura et al. | |
| 2007/0157742 A1 | 7/2007 | Kouduki et al. | |

FOREIGN PATENT DOCUMENTS

| | | |
|---|---|---|
| JP | 2003-032806 A | 1/2003 |
| JP | 2005-7914 | 1/2005 |
| JP | 2005-048823 A | 2/2005 |
| JP | 2005-69897 | 3/2005 |
| JP | 2005-99003 | 4/2005 |
| JP | 2005-238936 | 9/2005 |
| JP | 2005-354844 | 12/2005 |
| JP | 2006-51922 | 2/2006 |
| JP | 2006-90958 | 4/2006 |
| JP | 2006-101572 | 4/2006 |
| WO | WO03/095261 | 11/2003 |

OTHER PUBLICATIONS

English Translation of the International Preliminary Report on Patentability issued on Apr. 2, 2009 in corresponding International Patent Application PCT/JP2007/000930.

Chinese Office Action issued Aug. 3, 2011 in corresponding Chinese Patent Application 200780034421.4.

Chinese Office Action dated Dec. 31, 2011 issued in corresponding Chinese Patent Application No. 200780034421.4.

Japanese Notification of Reason(s) for Rejection dated Dec. 27, 2011 issued in corresponding Japanese Patent Application No. 2006-252531.

Japanese Office Action mailed Jul. 24, 2012 issued in corresponding Japanese Patent Application No. 2006-252531.

* cited by examiner

SENSOR-EQUIPPED AXLE UNIT HAVING A BUILT-IN MOTOR OF IN-WHEEL TYPE

CROSS REFERENCE TO RELATED APPLICATIONS

This application claims the benefit under 35 U.S.C. Section 371, of PCT International Application No. PCT/JP2007/000930, filed Aug. 29, 2007, which claimed priority to Japanese Application No. 2006-252531, filed Sep. 19, 2006 in the Japanese Patent Office, the disclosures of which are hereby incorporated by reference.

BACKGROUND OF THE INVENTION

The present invention relates to a sensor equipped axle unit having a built-in motor of in-wheel type including a hub bearing assembly, a reduction gear unit and an electric motor combined together in a unitary structure and, more particularly, to the control technology in controlling the traveling stability of an electrically driven automotive vehicle.

As means to reduce the environmental loading, the automotive vehicle is expected to transform from a power type utilizing a combustion engine to a different power type utilizing an electric motor in the future. Under these circumstances, the axle unit having an in-wheel type motor built therein has been suggested as a wheel support bearing assembly for the support of a vehicle drive wheel of an electrically powered automotive vehicle. (See, for example, the Patent Documents 1 and 2 quoted below.) When this suggested axle unit having the in-wheel type motor built therein is employed in the vehicle drive wheels of an electrically powered automotive vehicle, the vehicle drive wheels can be driven individually and independently of each other and, therefore, the use of a rather bulky drive transmitting mechanism such as, for example, a propeller shaft and/or a differential gear unit can be dispensed with from the automotive vehicle, allowing the latter to be manufactured lightweight and compact in size.

In association with the standard wheel support bearing assembly utilized in combustion engine vehicles, various controls such as, for example, suspension control and ABS (anti-lock brake system) are employed as a control technology for controlling the stability of each automotive vehicle. Detection of various operating statuses of the automotive vehicle with numerous sensors secured to the vehicle body structure is also performed so that the engine, brakes and/or steering wheel can be controlled based on a result of such detection.

[Patent Document 1]
JP Laid-open Patent Publication No. 2005-7914
[Patent Document 2]
JP Laid-open Patent Publication No. H05-332401 (FIGS. 1-3)

The electromotor driven type has a response characteristic higher than that of the combustion engine driven type and, therefore, the suspension control and/or the ABS control, when introduced into the electromotor driven vehicle, is/are effective to allow the attitude of the automotive vehicle to assume a higher stability than that accomplished when introduced into the combustion engine driven vehicle. In order to increase the precision of the suspension control and the ABS control, it is necessary to accurately measure the force acting on the automotive vehicle and then to perform the control based on a result of such force measurement.

The force acting on the automotive vehicle referred to above is in large part developed between a wheel tire and a road surface. This force is available in the form of a force acting in a direction of travel of the automotive vehicle, a cornering force acting in a direction perpendicular to the direction of travel of the automotive vehicle (a force acting in a direction axially of a vehicle drive wheel), and a normal force acting in a direction perpendicular to a ground plane a vertical force). In addition, it may be available in the form of an air drag dependent on the travelling velocity and an aerodynamic force brought about by a wind blowing in nature, but those are low in steady state. Accordingly, for the control to stabilize the vehicle attitude, detection of the forces acting between the wheel tire and the road surface in three axis directions referred to above with high response is sufficient.

However, measurement of the forces acting in the automotive vehicle with sensors fitted to the vehicle body structure such as hitherto practiced is nothing other than measurement of vibrations transmitted to the vehicle body structure through the suspension system and the chassis and, therefore, a time lag tends to occur in the resultant measurement. Because of this, a problem has been encountered with in that the response to control tends to be delayed if the resultant measurement involving the time lag is utilized in the stability control.

SUMMARY OF THE INVENTION

An object of the present invention is to provide a sensor equipped axle unit having an in-wheel type motor built therein, in which forces acting in three axis directions perpendicular to each other at a point of contact of the vehicle drive wheel with the road surface are measured, with high sensitivity, from the status of a component part, associated with the drive abort of the automotive vehicle, so that the vehicle body attitude stability control of the electromotor driven automotive vehicle can be accomplished with high accuracy. It is to be noted that in the case of the electromotor driven automotive vehicle, the component part associated with the drive abort of the automotive vehicle includes a tire, a wheel, a hub assembly, a drive source and a brake assembly.

The sensor equipped axle unit of the present invention having an in-wheel type motor built therein includes a hub bearing assembly, an electric motor, a reduction gear unit and a brake assembly, all arranged coaxially on a center axis of a vehicle drive wheel, and a sensor for measuring forces in three axis directions perpendicular to each other acting at a point of contact of the vehicle drive wheel with a road surface from the status of at least one of the hub bearing assembly, the electric motor, the reduction gear unit and the brake assembly. It is to be noted that the forces acting in the three axis directions referred to above includes a working force acting in a direction of travel of the automotive vehicle, a cornering force acting in a direction perpendicular to the direction of travel of the automotive vehicle (a force acting in a direction axially of a vehicle drive wheel), and a normal force acting in a direction perpendicular to a ground plane (a vertical force).

According to the above described construction of the present invention, from the status of the component part associated with the drive abort of the automotive vehicle, the forces acting in the three axis directions perpendicular to each other can be measured from the point of contact of the vehicle drive wheel with the road surface. The result of such measurement can be utilized in controlling the suspension system and/or the anti-lock brake system. Therefore, the attitude of the automotive vehicle can be stabilized during braking or cornering, thus securing safety.

In the present invention, the brake assembly referred to above is preferably an electric brake.

If the brake assembly is employed in the form of the electric brake, the braking control can be facilitated.

Also, the sensor equipped axle unit having an in-wheel type motor built therein, which is referred to above, is preferably fitted to a vehicle body structure through a suspension system having an attenuating module for attenuating a force, acting at the point of contact between the vehicle drive wheel and the road surface and then transmitting it to the vehicle body structure, which module is electrically operated to change an attenuating degree, and module for controlling the attenuating degree of the attenuating module, an output of the sensor being inputted to the attenuating degree controlling module. If the attenuating module of the suspension system is electrically operated to change the attenuating degree, control of the suspension system can be facilitated. The control of this suspension system is properly carried out by the output of the sensor.

As one of sensors for measuring the respective forces acting in the three axis directions referred to above, the use may be made of an electric current sensor for measuring a current value of the electric motor and a calculating module operable in response to an output of the electric current sensor for calculating the force acting at the point of contact between the vehicle drive wheel and the road surface in the direction of travel of the automotive vehicle.

Considering that the quantity of the electric current flowing across the electric motor varies depending on the magnitude of the force acting at the point of contact between the vehicle drive wheel and the road surface in the direction of travel of the automotive vehicle, if the relation between the working force and the amount of the electric current is determined beforehand by means of a series of experiments and/or simulations, the magnitude of the working force referred to above can be calculated. The calculating module is operable to refer to the relation between the working force and the amount of the electric current, which has been determined by means of the experiments and/or simulations, to calculate, from an output of the electric current sensor, the force acting at the point of contact between the vehicle drive wheel and the road surface in the direction of travel of the automotive vehicle. When the working force acting in the direction of travel is determined in this way, the working force can be detected with high accuracy.

As one of the sensors for measuring the forces acting in the three axis directions referred above, a braking force sensor is preferably provided for measuring the braking force acting in the brake assembly in combination with a calculating module for calculating, from an output of the braking force sensor, the force acting at the point of contact between the vehicle drive wheel and the road surface in the direction of travel.

Considering that the magnitude of the braking force acting in the brake assembly varies depending on the magnitude of the force acting at the point of contact between the vehicle drive wheel and the road surface in the direction of travel of the automotive vehicle, if the relation between the working force and the braking force is determined beforehand by means of a series of experiments and/or simulations, the magnitude of the working force referred to above can be calculated. The calculating module is operable to refer to the relation between the working force and the braking force, which has been determined by means of the experiments and/or simulations, to calculate, from an output of the braking force sensor, the force acting at the point of contact between the vehicle drive wheel and the road surface in the direction of travel of the automotive vehicle. When the working force acting in the direction of travel is determined in this way, the working force can be detected with high accuracy.

As one of the sensors for measuring the forces acting in the three axis directions referred above, an axial strain sensor may be provided for measuring the axially acting strain on a stationary raceway ring of the hub bearing assembly in combination with a calculating module for calculating, from an output of the axial strain sensor, the force acting at the point of contact between the vehicle drive wheel and the road surface in the axial direction of the vehicle drive wheel. This axial strain sensor is fitted to, for example, the stationary raceway ring.

Considering that the manner of change of the magnitude of the axially acting strain on the stationary raceway ring varies depending on the magnitude of the force acting at the point of contact between the vehicle drive wheel and the road surface in the axial direction of the vehicle drive wheel, if the relation between the working force and the axially acting strain is determined beforehand by means of a series of experiments and/or simulations, the magnitude of the working force referred to above can be calculated. The calculating module is operable to refer to the relation between the working force and the axially acting strain, which has been determined by means of the experiments and/or simulations, to calculate, from an output of the axial strain sensor, the force acting at the point of contact between the vehicle drive wheel and the road surface in the axial direction of the vehicle drive wheel. When the working force acting in the axial direction is determined in this way, the working force can be detected with high accuracy.

As one of the sensors for measuring the forces acting in the three axis directions referred above, a radial strain sensor may be provided for measuring the radial strain acting on a stationary raceway ring of the hub bearing assembly in combination with a calculating module for calculating, from an output of the radial strain sensor, the force acting at the point of contact between the vehicle drive wheel and the road surface in a vertical direction. This axial strain sensor is fitted to, for example, a casing of the reduction gear unit.

Considering that the manner of change of the magnitude of the radial strain acting on a stationary raceway ring varies depending on the magnitude of the force acting at the point of contact between the vehicle drive wheel and the road surface in the vertical direction, if the relation between the working force and the radial acting strain is determined beforehand by means of a series of experiments and/or simulations, the magnitude of the working force referred to above can be calculated. The calculating module is operable to refer to the relation between the working force and the radially acting strain, which has been determined by means of the experiments and/or simulations, to calculate, from an output of the radial strain sensor, the force acting at the point of contact between the vehicle drive wheel and the road surface in the vertical direction. When the working force acting in the vertical direction is determined in this way, the working force can be detected with high accuracy.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERED EMBODIMENTS

A preferred embodiment of the present invention will now be described in detail with particular reference to FIGS. 1 to 9. At the outset, a summary of this preferred embodiment will first be described with particular reference to FIG. 1. The illustrated sensor equipped axle unit having an in-wheel type motor built therein includes a hub bearing assembly A for rotatably supporting a hub of a vehicle drive wheel 70, an electric motor B as a source of rotatory drive, a reduction gear unit C for reducing the rotation of the electric motor B and then transmitting it to the hub and a brake assembly D for applying a braking force to the hub, all being arranged in alignment with a center axis O of the vehicle drive wheel 70. What has just been stated here does not necessarily means that all of the component elements are positioned on the center axis O, but means that those component parts functionally cooperate with each other relative to the center axis O. It is to be noted that in the following description, one side of a vehicle body structure laterally away from the longitudinal center thereof in a condition, in which an object is mounted on the vehicle body structure, is referred to as "outboard" whereas the opposite side of the vehicle body structure laterally close towards the longitudinal center thereof in the same condition is referred to as "inboard".

Figure 2:
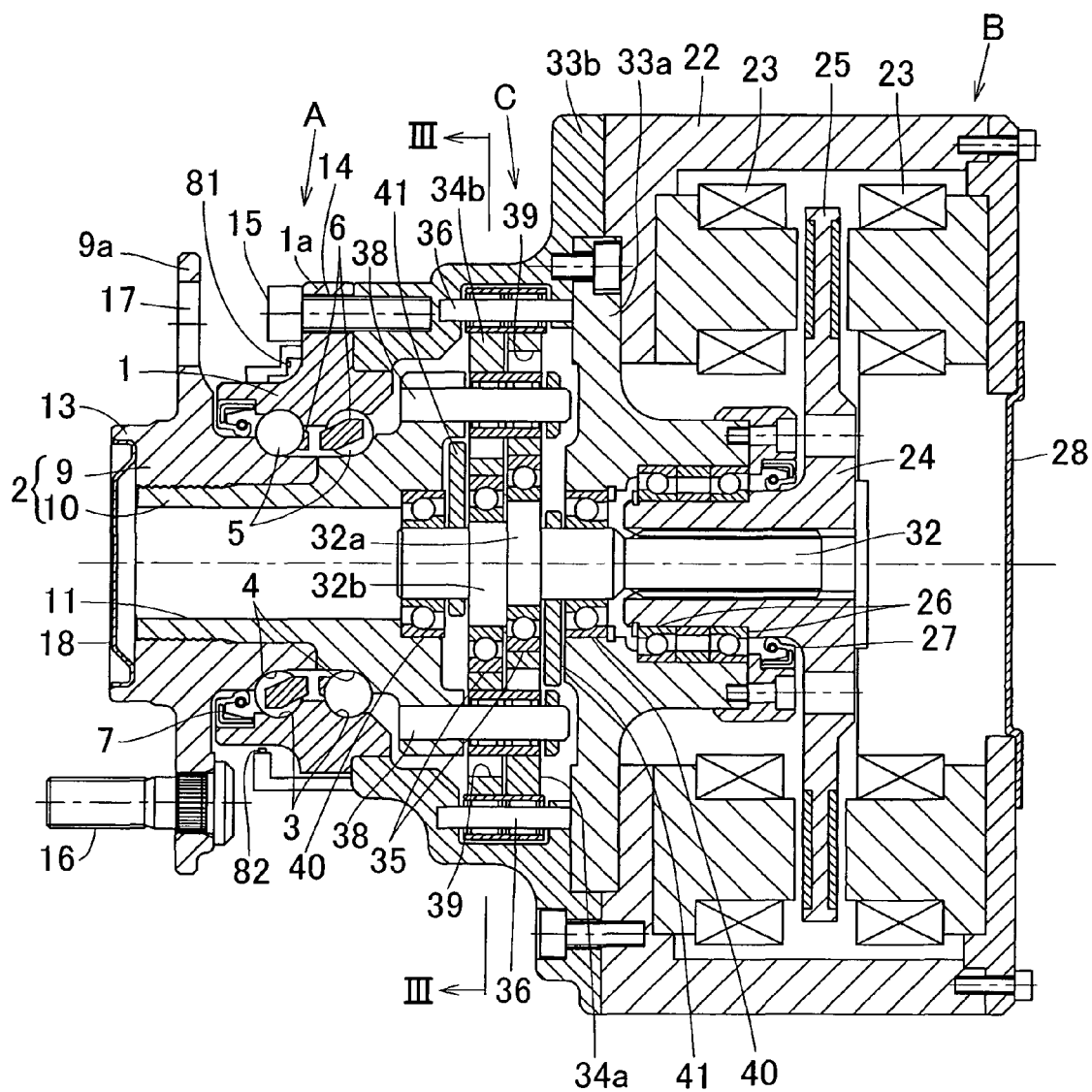
FIG. 2 is a sectional view showing a hub bearing assembly, a reduction gear unit and an electric motor employed in the axiel unit.

As best shown in FIG. 2, the hub bearing assembly A includes an outer member 1 having an inner periphery formed with a plurality of rows of rolling surfaces 3, an inner member having rolling surfaces 4 formed therein in opposition to the respective rolling surfaces 3, and a plurality of rows of rolling elements 5 interposed between the respective opposed rolling surfaces 3 and 4 in the outer and inner members 1 and 2. This hub bearing assembly A is rendered to be a double row angular contact bearing type, in which the rolling elements 5 are used in the form of balls that are retained by a retainer 6 employed for each row. The rolling surfaces 3 and 4 have an arcuately sectioned shape and the rolling surfaces 3 and 4 are so formed as to have a contact angle oriented outwardly. An outboard open end of a bearing space delimited between the outer member 1 and the inner member 2 is sealed by a sealing devices 7.

The outer member 1 is the one that serves as a stationary member and is of one-piece construction in its entirety including a flange 1a adapted to be fitted to a casing 33b on an outboard side of the reduction gear unit C. The flange 1a has a plurality of vehicle body fitting holes 14 defined therein at a corresponding number of circumferential portions thereof. The outer member 1 is fitted to the casing 33b by means of fitting bolts 15 that are inserted into corresponding mounting holes 14.

The inner member 2 is the one that serves as a rotatable member and is made up of an outboard segment 9, having a hub flange 9a formed therein for the support of a vehicle wheel 70 and a brake wheel 46, and an inboard segment 10 having an outboard end thereof mounted on an inner periphery of the outboard segment 9 and integrated by crimping with the outboard segment 9. The rows of the rolling surfaces 4 referred to previously are formed respectively in the outboard segment 9 and the inboard segment 10. The inboard segment 10 has a center bore 11 defined in a center thereof. The hub flange 9a has a plurality of press-fitting holes 17 defined in respective circumferential locations thereof for receiving the corresponding hub bolts 16 that are press-fitted therein. The hub flange 9a of the outboard segment 9 has a root portion thereof formed with a cylindrical pilot portion 13 so as to protrude in an outboard direction, which pilot portion 13 serves to guide the vehicle wheel 70 and the brake wheel 46. This pilot portion 13 has an inner periphery to which a cap 18 is fitted so as to close an outboard end of the center bore 11.

The electric motor B is of an axial gap type, in which an axial gap is provided between a stator 23, fixed to a cylindrical casing 22, and a rotor mounted on an output shaft 24. The output shaft 24 is supported in a cantilever fashion by two bearing units 26 within a cylindrical portion of the casing 33a on the inboard side of the reduction gear unit C. An inboard end of the gap between the output shaft 24 and the casing 33a is sealed by a sealing member 27. Also, an inboard opening of the casing 22 has a cap 28 mounted thereon.

Figure 3:
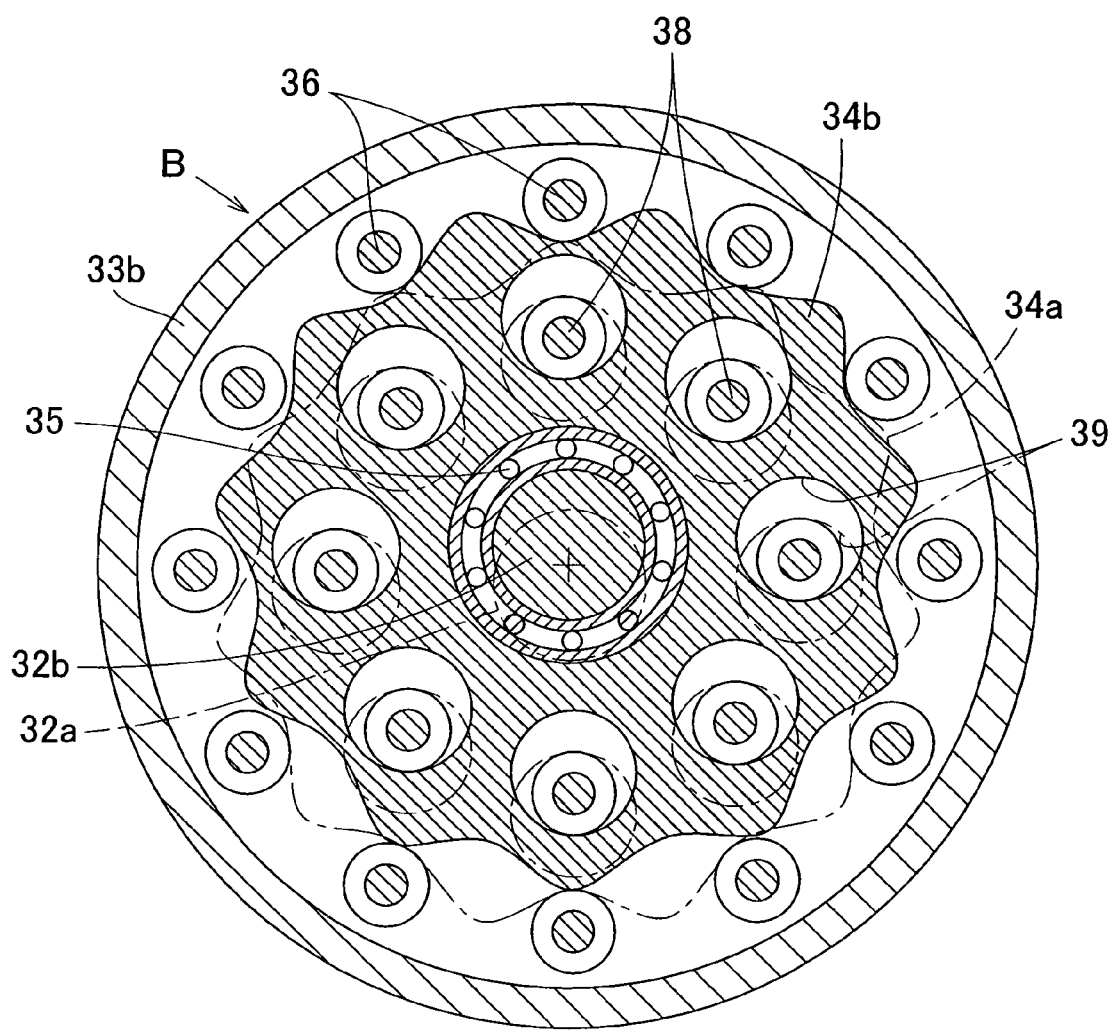
FIG. 3 is a cross sectional view taken along the line III-III in FIG. 2.

As shown in FIGS. 2 and 3, the reduction gear unit C is so structured as to represent a cycloid reduction gear unit. In other words, the reduction gear unit C is of a structure, in which two curved plates 34a and 34b, each having an appearance representing a gently waved trochoidal curve, are mounted on eccentric portions 32a and 32b of an input shaft 32 through bearing units 35, respectively, so that eccentric motion of each of those curved plates 34a and 34b can be guided by a plurality of outer pins 36, each bridging between the inboard and outboard casings 33a and 33b, at an outer periphery thereof, and, on the other hand, a plurality of inner pins 38, which are fitted to the inboard segment 10 of the inner member 2, are inserted into and positioned inside corresponding throughholes 39 defined inside each of the curved plates 34a and 34b. The input shaft 32 referred to above is splined to the output shaft 24 of the electric motor B for rotation together therewith. It is to be noted that the input shaft 32 is supported at its opposite ends by the inboard casing 33a and an inner diametric surface of the inboard segment 10 of the inner member 2 through associated bearing units 40.

When the output shaft 24 of the electric motor B is driven, the curved plates 34a and 34b mounted on the input shaft 32 that rotates together therewith undergo an eccentric motion.

The eccentric motion of those curved plates 34a and 34b is transmitted to the inner member 2, which is a hub assembly for the vehicle wheel, through the engagement between the inner pins 38 and the throughholes 39, causing the inner member 2 to undergo rotation about its own axis. The rotation of the inner member 2 is thus reduced relative to the rotation of the output shaft 24. By way of example, one state cycloid reduction gear unit is effective to provide a reduction gear ration of 1/10 or higher.

The two curved plates 34a and 34b are mounted on the respective eccentric portions 32a and 32b of the input shaft 32 in a manner displaced 180° in phase relative to each other so that the respective eccentric movements can be counterbalanced with each other, and counterweights 41 are mounted on respective sides of each of the curved plates 34a and 34b in a manner displaced in a direction counter to the respective eccentric portion 32a and 32b so that vibrations induced as a result of the eccentric movements of the curved plates 34a and 34b can be counterbalanced.

Figure 4:
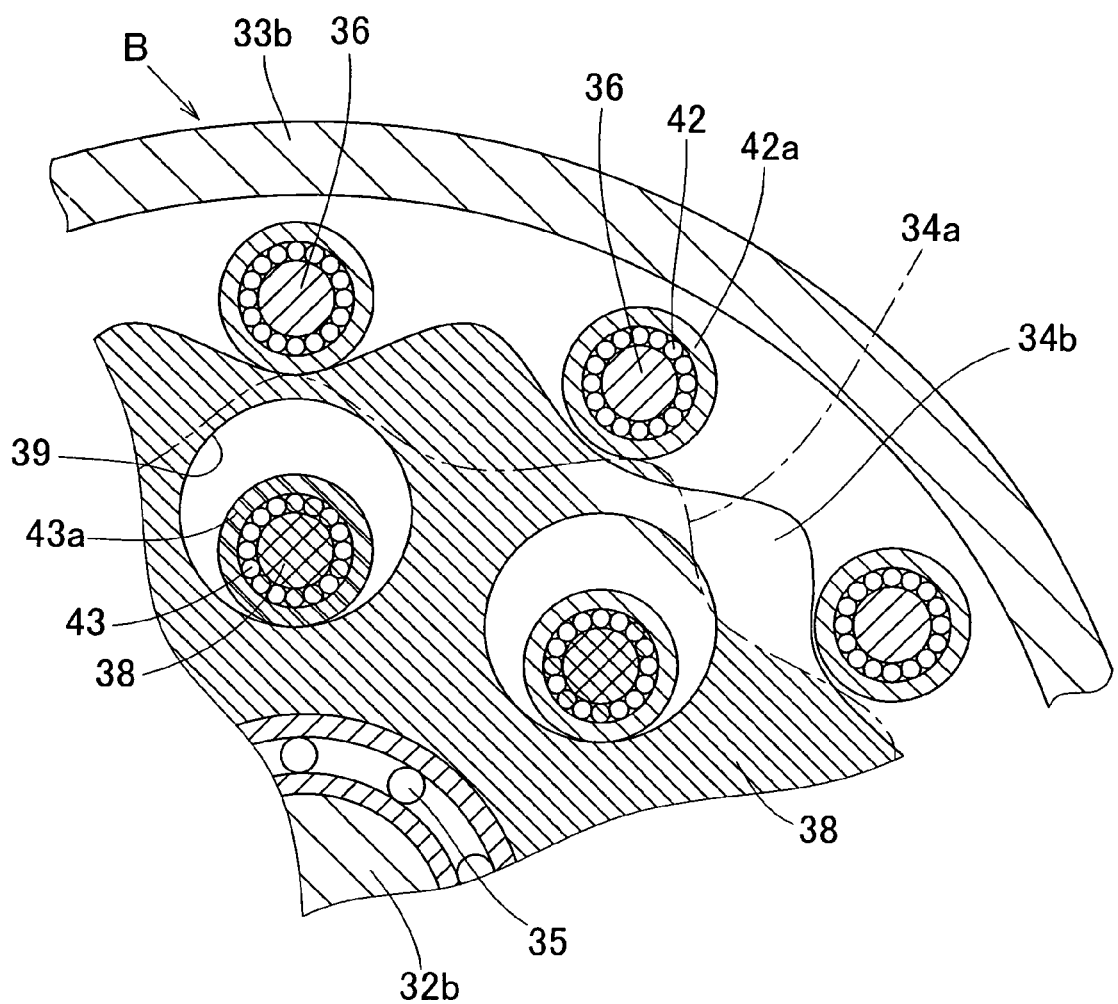
FIG. 4 is a sectional view showing an important portion of FIG. 3 on an enlarged scale.

As best shown in FIG. 4, the outer and inner pins 36 and 38 have bearing units 42 and 43 mounted thereon, and outer rings 42a and 43a of those bearing units 42 and 43 are held in rolling contact with the respective outer peripheries of the curved plates 34a and 34b and inner peripheries of the throughholes 39. Accordingly, it is possible to transmit the eccentric motions of the curved plates 34a and 34b smoothly to the inner member 2 to cause the latter to rotate, with the contact resistance between the outer pins 36 and the outer peripheries of the curved plates 34a and 34b and the contact resistance between the inner pins 38 and the inner peripheries of the respective throughholes 39 having been reduced.

Figure 5:
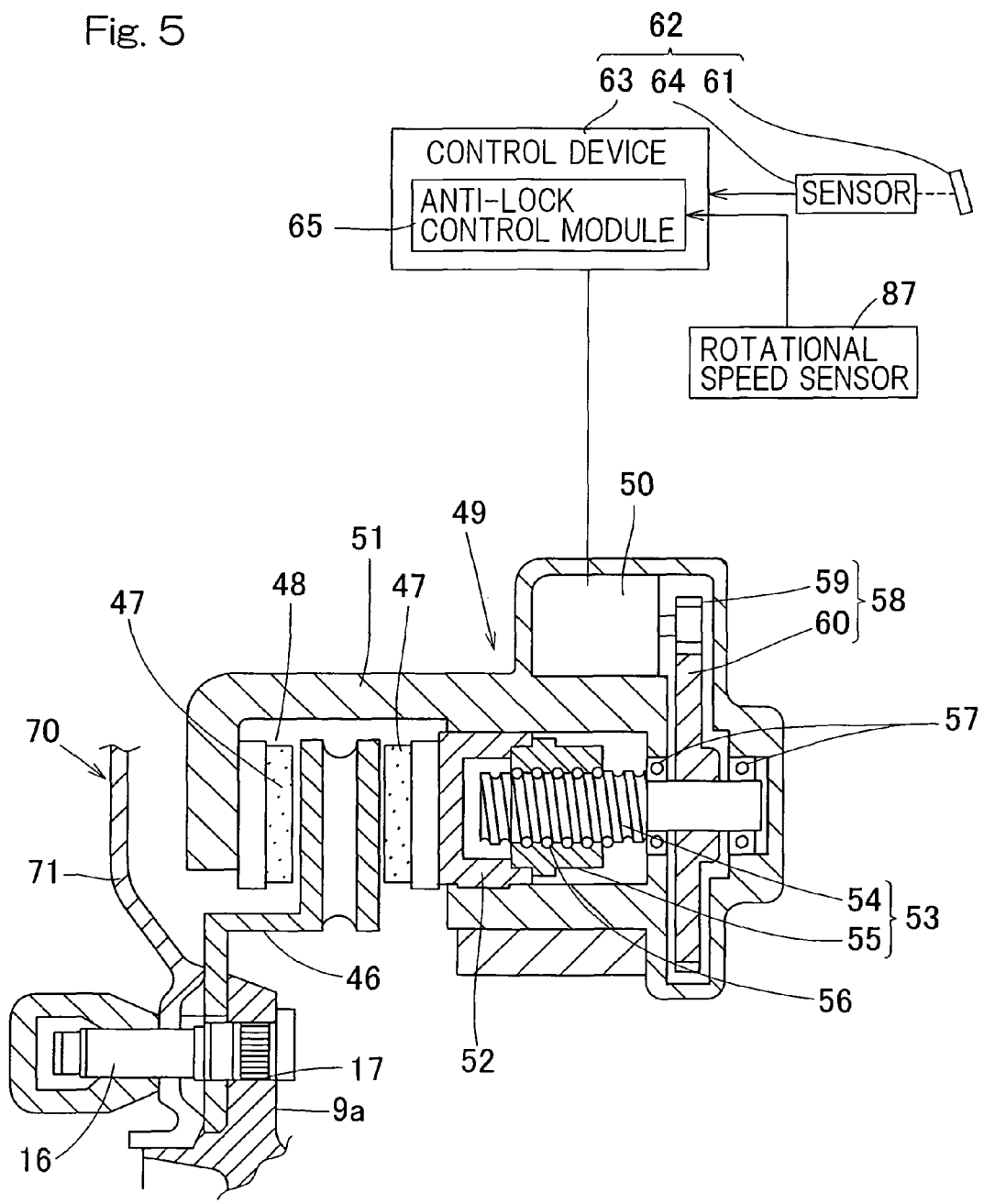
FIG. 5 is a sectional view showing a brake assembly employed in the axel unit.

Referring now to FIG. 5, the brake assembly D includes a brake wheel 46 fitted to the hub flange 9a together with the vehicle drive wheel 70, an actuating units 48 each having a brake pad 47 engageable frictionally with the brake wheel 46, and a drive unit 49 for actuating the brake pads 47 and is rendered to be an electrically actuated brake utilizing as a drive source for the drive unit 49, an electric motor 50 for the brake assembly. The brake wheel 46 is in the form of a brake disc. The brake pads 47 are employed in a pair so as to sandwich the brake wheel 46. One of the brake pads 47 is fixed to a brake frame 51 and the other of the brake pads 47 is carried by a retractable member 52 fitted to the brake frame 51 for linear reciprocating movement relative thereto. The direction of linear reciprocating movement of the retractable member 52 lies in a direction confronting the brake wheel 46. This retractable member 52 is prevented from rotating relative to the brake frame 51.

The drive unit 49 includes the electric brake motor 50 referred to above, a ball screw 53 for converting a rotary output of this electric brake motor 50 into a linear reciprocating movement, which results in a braking force exerted by the brake pads 47, and an output of the electric brake motor 50 is transmitted to the ball screw 53 through a reduction and transmitting mechanism 58. The ball screw 53 has a screw shaft 54 supported by the brake frame 51 by means of bearings 57 for rotation about its own axis, and a nut 55 is fixed to the retractable member 52. The retractable member 52 and the nut 55 may be of one-piece construction.

The ball screw 43 referred to above includes, in addition to the screw shaft 54 and the nut 55, a plurality of balls 56 interposed in helical grooves formed in part in an outer peripheral surface of the screw shaft 54 and in part in an inner peripheral surface of the nut 55. The nut 55 includes a recirculating module (not shown) for recirculating a chain of the balls 56 between the screw shaft 54 and the nut 55 along an endless path. This recirculating module may be either an external recirculating type utilizing a guide plate or a return tube, or an internal recirculating type utilizing an end chap or a die. Also, since this ball screw 53 is operable to perform a reciprocating movement over a short distance, it may be of a type having no recirculating module referred to above, for example, a retainer type in which the plural balls 56 between the screw shaft 54 and the nut 55 are retained by a retainer.

The reduction and transmitting mechanism 58 is a mechanism capable of reducing the rotation of the electric brake motor 50 to the ball screw 53 of the screw shaft 54 after the number of rotation has been reduced and includes a train of gears. In the illustrated embodiment, the reduction and transmitting mechanism 58 includes a drive gear 59 provided on an output shaft of the electric motor 50 and a driven gear 60 provided on the screw shaft 54 and meshed with the drive gear 59. The reduction and transmitting mechanism 58, other than the type discussed above, may be of any other type such as, for example, that including a worm and a worm wheel (both not shown).

The brake assembly D referred to above includes an operating unit 62 for controlling the electric motor 50 according to the operation of an operating member such as, for example, a brake pedal. This operating unit 62 is provided with an anti-lock control module 65. The operating unit 62 ia made up of the operating member 61, a sensor 64 capable of detecting the amount of operation and the direction of operation of the operating member 61, and a control device 63 for controlling the electric brake motor 50 in response to a detection signal fed from the sensor 64, and the anti-lock control module 65 referred to above is provided in this control device 63. The control device 63 includes module for generating a motor control signal and a motor drive circuit (not shown) capable of controlling the electric motor current in response to the motor control signal.

The anti-lock control module 65 is a module for preventing the rotation of the vehicle drive wheel 70 from being locked by adjusting the braking force, exerted by the electric motor 50, in dependence on the number of revolutions of the vehicle drive wheel 70. This anti-lock control module 65 is so designed as to perform such an operation that when the incipiency of the vehicle drive wheel 70 being locked is detected in reference to the rotational speed of such vehicle drive wheel 70 that is detected during the braking, the drive current of the electric motor 50 can be lowered, or a reverse rotation output is temporarily generated, to thereby adjust the braking force, that is, a clamping force with which the brake pads 47 clamp the brake wheel 46. For the detection of the rotational speed of the vehicle drive wheel 70, an output from a rotational speed sensor 87 for the electric motor B as will be described later can be utilized.

Figure 1:
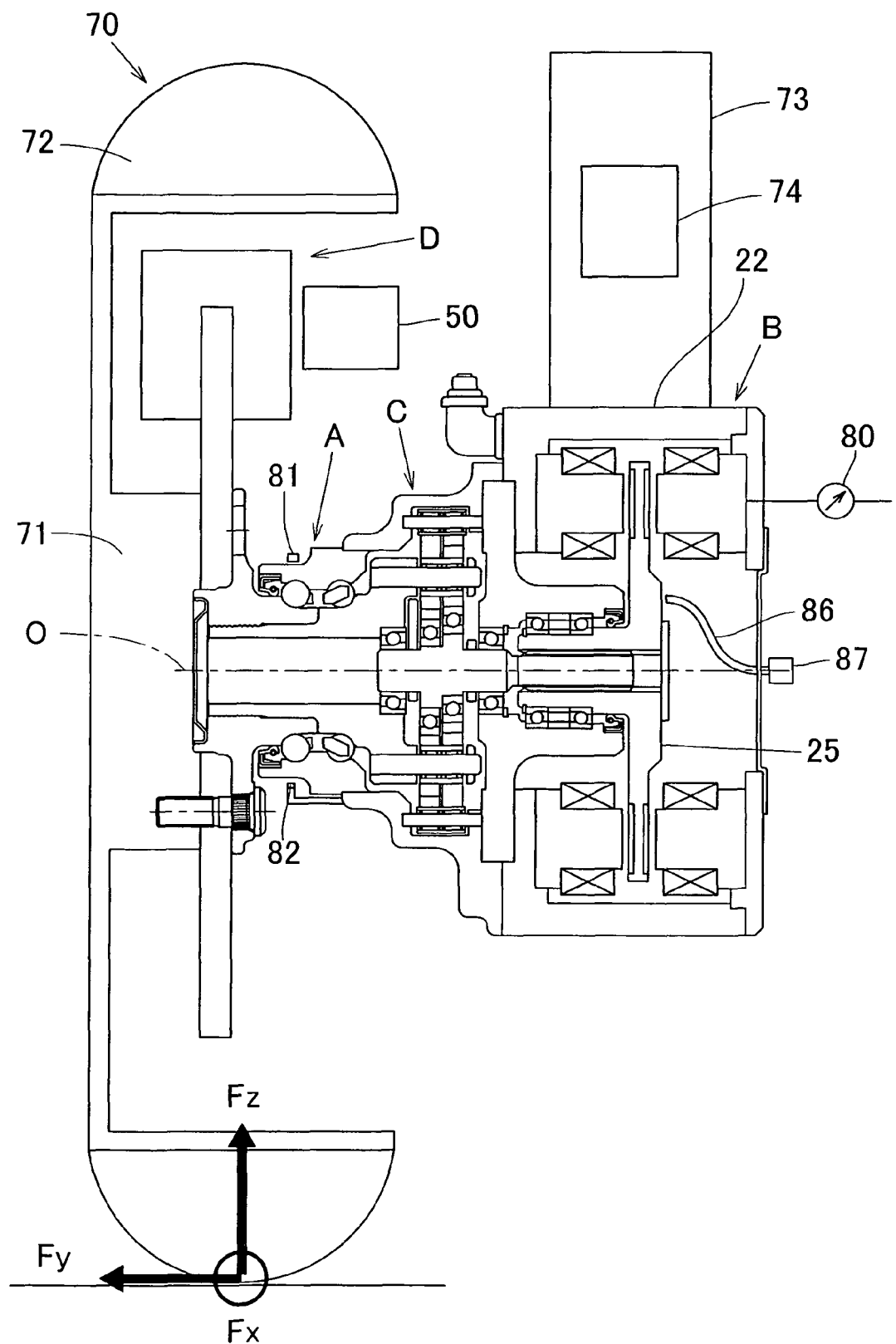
FIG. 1 is a schematic diagram showing a sensor equipped axle unit having an in-wheel type motor built therein in accordance with a preferred embodiment of the present invention.

As shown in FIG. 1, the vehicle drive wheel 70 is mounted on the hub flange 9a of the hub bearing assembly A together with the brake wheel 46. The vehicle drive wheel 70 is of a type having a wheel disc 71 on which a wheel tire 72 is mounted. When with the brake wheel 46 sandwiched between the hub flange 9a, shown in FIG. 5, and the wheel disc 71, the hub bolts 16 press-fitted into the press-fitting holes 17 in the hub flange 9a are threading into the wheel disc 71, the vehicle drive wheel 70 and the brake wheel 46 can be fixed to the hub flange 9a.

This axle unit is secured to the vehicle body structure (not shown) through the suspension system 73 fitted to an outer peripheral portion of the casing 22 of the electric motor B shown in FIG. 1. The suspension system 73 is provided with an attenuating module 74 for attenuating a force, acting at a point of contact of the vehicle drive wheel 70 with the road surface, before such force is transmitted to the vehicle body structure. This attenuating module 74 is in the form of a damper or a shock absorber. The attenuating module 74 is so designed as to vary the extent of attenuation by being electrically operated.

The force acting at the point of contact between the vehicle drive wheel 70 and the road surface is a composite of a force Fx in a direction of travel, a force Fy in a direction axially of the vehicle drive wheel and a force Fz in a vertical direction, which forces are perpendicular to each other. The axle unit is provided with sensors for measuring the respective three axis directions. The force Fx in the direction of travel is determined from an output of an electric current sensor 80 for detecting the value of an electric current I of the electric motor B. The force Fy in the direction axially of the vehicle drive wheel is determined by an output of an axial strain sensor 81 for detecting an axially acting strain $\epsilon y$ of the outer member 1 which is a stationary raceway ring of the hub bearing assembly A. The force Fz in the vertical direction is determined by an output of a radial strain sensor 82 for detecting a radially acting strain $\epsilon z$ of the outer member 1 which is a stationary raceway ring of the hub bearing assembly A.

Figure 6:
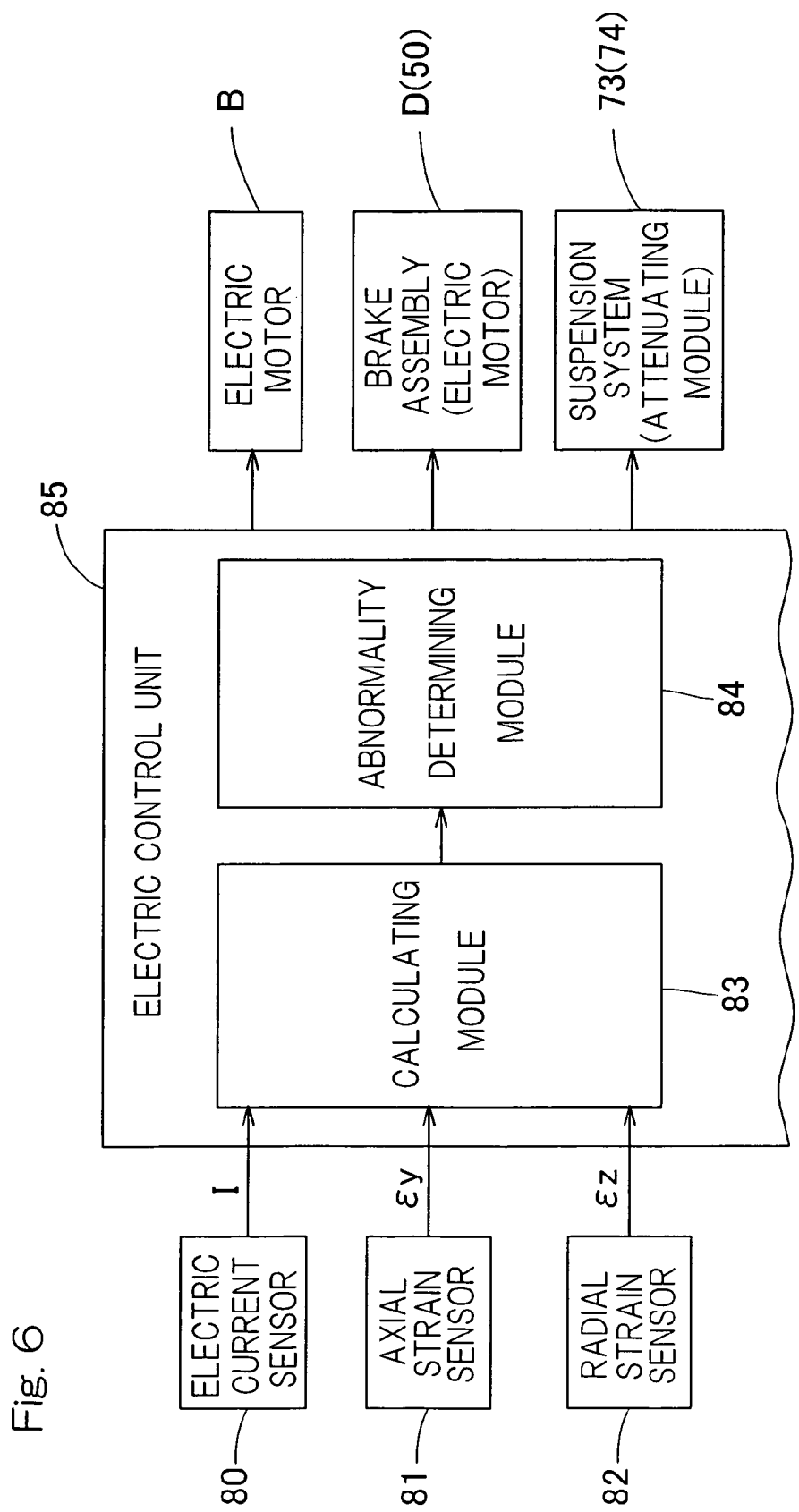
FIG. 6 is a block diagram showing a control system.

As best shown in FIG. 6, those sensors 80, 81 and 82 are connected with a calculating module 83 and an abnormality determining module 84 for processing respective outputs generated therefrom. Both of the calculating module 83 and the abnormality determining module 84 are provided in, for example, an electric control unit (ECU) of the automotive vehicle. The calculating module 83 and the abnormality determining module 84 may be incorporated in an electronic circuit device (not shown) such as, for example, a circuit substrate provided for each axle unit. An output side of the electric control unit 85 is connected with the electric motor B, the electric motor 50 of the brake assembly D and the attenuating module 74 of the suspension system 73.

Considering that the amount of the electric current flowing across the electric motor B varies depending on the magnitude of the force acting at the point of contact between the vehicle drive wheel and the road surface in the direction of travel, if the relation between the working force and the amount of the electric current is determined beforehand by means of a series of experiments and/or simulations, the magnitude of the working force referred to above can be calculated. The calculating module 83 is operable to refer to the relation between the working force and the amount of the electric current, which has been determined by means of the experiments and/or simulations, to calculate, from an output of the electric motor 50, the force acting at the point of contact between the vehicle drive wheel and the road surface in the direction of travel.

Considering that the manner of change of the magnitude of the axially acting strain on the outer member 1, which is the stationary raceway ring, varies depending on the magnitude of the force acting at the point of contact between the vehicle drive wheel 70 and the road surface in the axial direction of the vehicle drive wheel 70, if the relation between the working force and the axially acting strain is determined beforehand by means of a series of experiments and/or simulations, the magnitude of the working force referred to above can be calculated. The calculating module 83 is operable to refer to the relation between the working force and the axially acting strain, which has been determined by means of the experiments and/or simulations, to calculate, from an output of the axial strain sensor 81, the force acting at the point of contact between the vehicle drive wheel 70 and the road surface in the axial direction of the vehicle drive wheel 70.

Also, considering that the manner of change of the magnitude of the radial strain acting on the outer member 1, which is the stationary raceway ring, varies depending on the magnitude of the force acting at the point of contact between the vehicle drive wheel 70 and the road surface in the vertical direction, if the relation between the working force and the radial acting strain is determined beforehand by means of a series of experiments and/or simulations, the magnitude of the working force referred to above can be calculated. The calculating module 83 is operable to refer to the relation between the working force and the radially acting strain, which has been determined by means of the experiments and/or simulations, to calculate, from an output of the radial strain sensor 82, the force acting at the point of contact between the vehicle drive wheel 70 and the road surface in the vertical direction.

Based on various information obtained in the manner described above, an output for the automotive vehicle attitude control is outputted from the electric control unit 85. By way of example, to facilitate a smooth cornering, it is outputted to the electric motor B to control the rotational speed of each of the left and right vehicle drive wheels 70. To prevent the vehicle drive wheel 70 from being locked during the braking, it is outputted to the electric motor 50 of the brake assembly D to control the braking. To prevent the vehicle body structure from being considerably tilted leftwards or rightwards during the cornering or to prevent the vehicle body structure from abruptly fling forward during the acceleration or dive forwardly during the braking, it is outputted to the attenuating module 74 of the suspension system 73 to control the suspension system. Also, the abnormality determining module 84 outputs an abnormality signal in the event that the forces in the three axis directions exceed a tolerance. This abnormality signal can also be used in vehicle control of the automotive vehicle. Also, if the working force acting between the vehicle drive wheel and the road surface is outputted in a real time, a meticulous attitude control can be accomplished.

Figure 7:
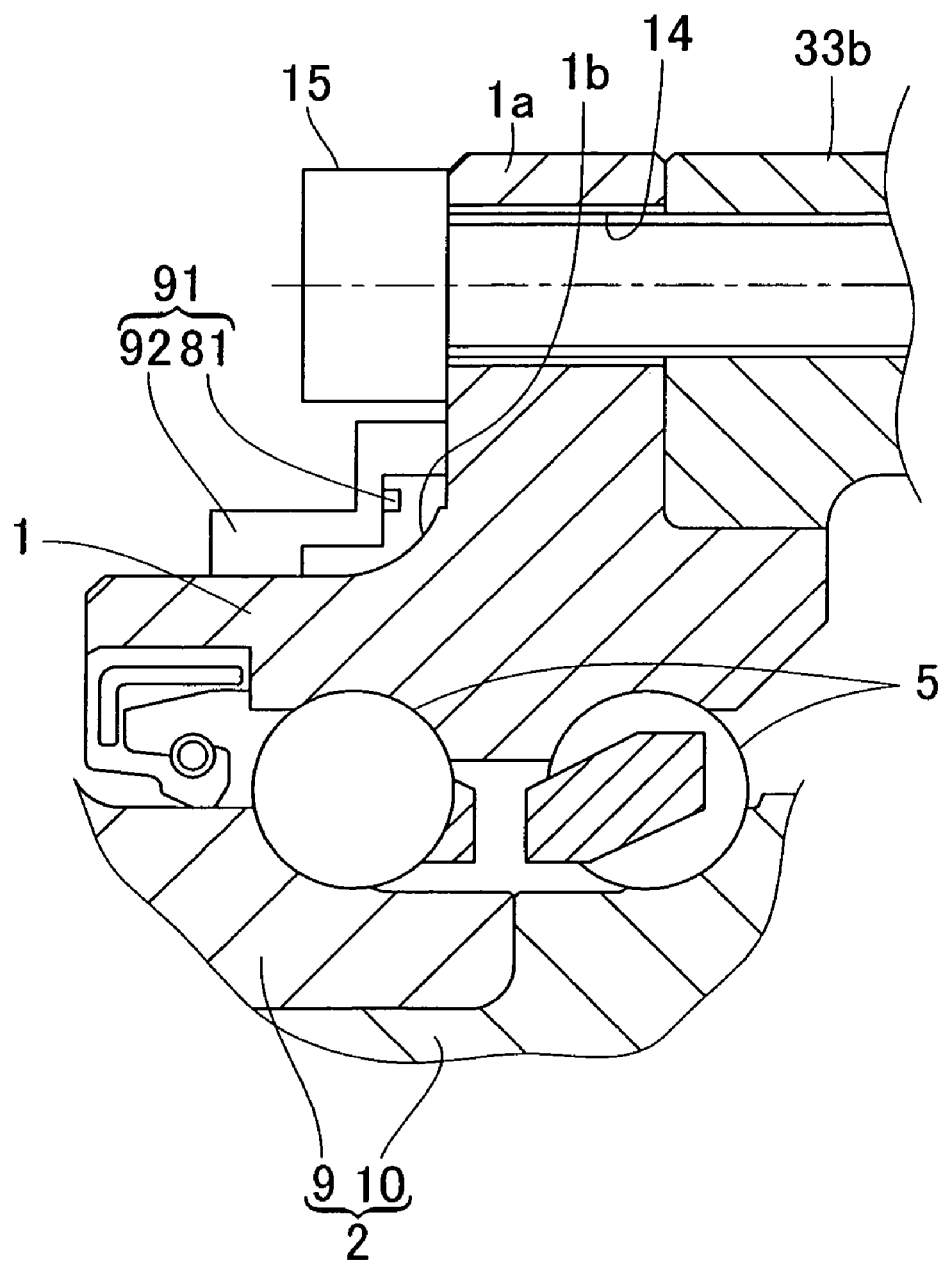
FIG. 7 is a sectional view showing the mounting of an axial strain sensor of the axle unit on an enlarged scale.
Figure 8:
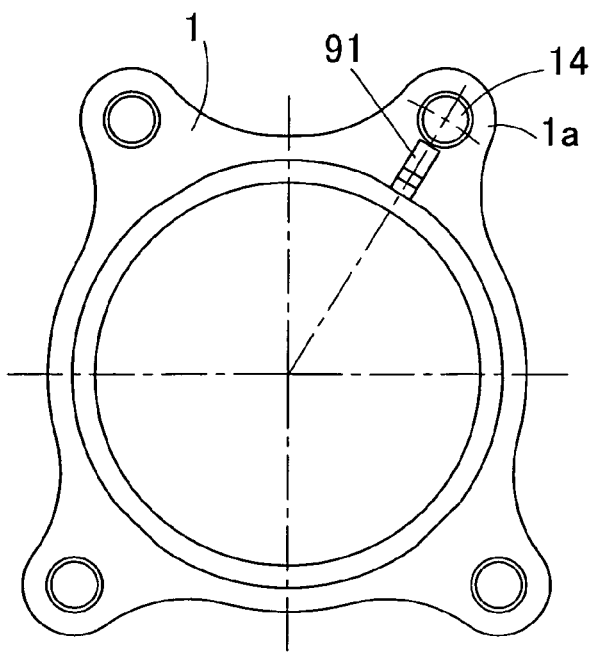
FIG. 8 is a front elevational view showing an outer member of the hub bearing assembly and a sensor unit for the axial strain sensor.
Figure 9A:
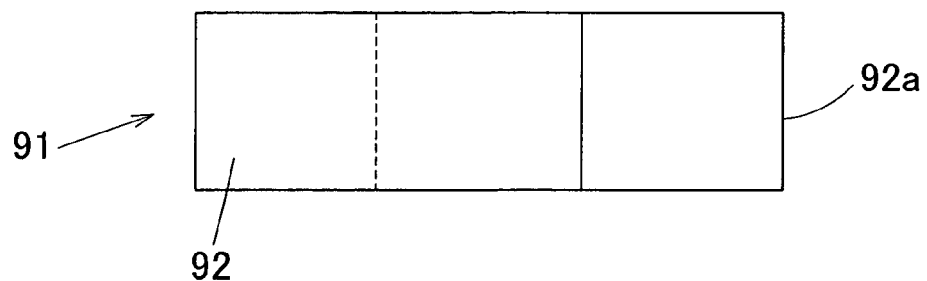
FIG. 9A is a top plan view showing the sensor unit.
Figure 9B:
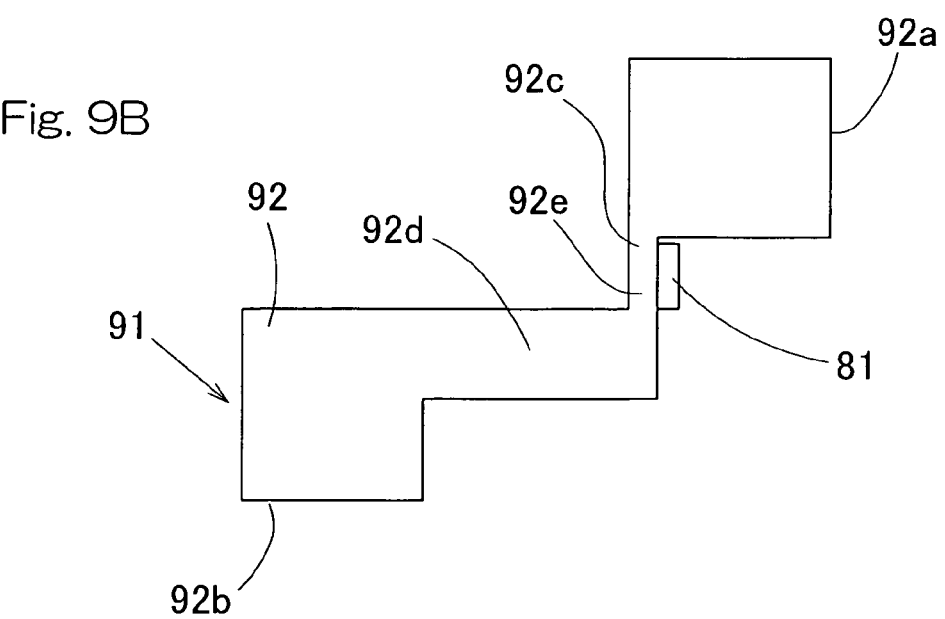
FIG. 9B is a side view showing the sensor unit.

The axial strain sensor 81 is installed in, for example, a manner as shown in FIGS. 7 to 9. In other words, the axial strain sensor 81 is fitted to a sensor carrier member 92 to form a sensor unit 91, which is in turn fixed to an outer peripheral portion of the outer member 1 of the hub bearing assembly A. The sensor carrier member 92 has a first contact fixing portion 92a, which is fixed in contact with the neighborhood of a fitting hole 14 defined in the outer member 1, and a second contact fixing portion 92b fixed to the outer peripheral surface of the outer member 1 in contact therewith. Also, the sensor carrier member 92 is so structured as to represent an L-shaped configuration including a radially extending segment 92c, which extends in a radial direction and includes the first contact fixing portion 92a, and an axially extending segment 92d, which extends in an axial direction and includes the second contact fixing portion 92b. The radially extending segment 92c has a wall thickness reduced to have a low rigidity as compared with that of the axially extending segment 92d. The axial strain sensor 81 is fitted to the radially extending segment 92c of such a low rigidity.

The sensor unit 91 referred to above is fixed to the outer peripheral portion of the outer member 1 through the first and second contact fixing portions 92a and 92b then held at respective positions where they are held in the same phase relation relative to the circumferential direction of the outer member 1. When the first and second contact fixing portions 92a and 92b are held in the same phase in the circumferential direction of the outer member 1, the length of the sensor carrier member 92 can be reduced and, therefore, installation of the sensor unit 91 can be facilitated. The axial strain sensor 81 is fixed to the sensor carrier member 92 by the use of, for example, a bonding material.

The sensor carrier member 92 is of such a shape, and made of such a material, which will not result in plastic deformation thereof when being fixed to the outer member 1. Also, the sensor carrier member 92 is required to be of such a shape that it will not deform plastically even when the maximum possible load expected in the wheel support bearing assembly is applied thereto. The maximum possible force expected is the maximum possible force expected during the travel which does not lead to a vehicle trouble. It is because once the plastic deformation occurs in the sensor carrier member 92, the deformation of the outer member 1 will not be accurately transmitted to the sensor carrier member 92 and, therefore, the measurement of the strain will be thus be adversely affected.

The sensor carrier member 92 can be prepared by means of, for example, a press work. If the sensor carrier member 92 is in the form of a product of the press work, the cost can be reduced.

Also, the sensor carrier member 92 may be in the form of an article made of a sintered metal by the use of a powdery metal injection molding technique. The powdery metal injection molding is one of molding technologies used with metal or an intermetallic compound and includes a step of kneading the metallic powder with a binder to provide a kneaded material, a step of injection molding the kneaded material, a step of degreasing the resultant molded product and a step of sintering the molded product. With this powdery metal injection molding, some advantages can be obtained in which a sintered element having a high sintered density as compared with the standard powdery metallurgy can be obtained and the sintered metal product can be manufactured with high dimensional accuracy and can have a high mechanical strength.

For the axial strain sensor 81, any of various types can be employed. By way of example, where the axial strain sensor 81 is structured in the form of a metallic foil strain gauge, and considering the durability of this metallic foil strain gauge, the amount of strain at a portion of the sensor carrier member 92, where the axial strain sensor 81 is mounted, is preferably equal to or lower than 1,500 micro-strain even when the maximum expected load is applied to the wheel support bearing assembly. By the reason similar to that described above, where the axial strain sensor 81 is structured in the form of a semiconductor strain gauge, the amount of the strain referred to above is preferably equal to or lower than 1,000 micro-strain. Also, where the axial strain sensor 81 is structured in the form of a thick film type sensor, the amount of the strain referred to above is preferably equal to or lower than 1,500 micro-strain.

Since the structure is employed, in which the sensor unit 91 made up of the sensor carrier member 92 and the axial strain sensor 81 fitted to the sensor carrier member 92 is fitted to the outer member 1, the sensor for detection of the axially acting load can be installed compactly. Since the sensor carrier member 92 is a simple component part that is fitted to the outer member 1, fitting of the axial strain sensor 81 thereto makes it possible to render it to be excellent in mass production with the cost reduced.

When the load is applied to the inner member 2, which is a hub assembly for the vehicle drive wheel 70, by mean of the force acting axially at the point of contact between the vehicle drive wheel 70 and the road surface, the outer member 1 undergoes deformation through the rolling elements 5 and such deformation is transmitted to the sensor carrier member 92 then fitted to the outer member 1, resulting in a corresponding deformation of the sensor carrier member 92. The axial strain sensor 81 measures the strain induced in the sensor carrier member 92. At this time, the radially extending segment 92c of the sensor carrier member 92 deforms in correspondence with deformation of the flange 1a of the outer member 1. In the case of the illustrated embodiment, since the radially extending segment 92c has a rigidity lower than that of the outer member 1 and the sensor carrier member 92 is so shaped as to represent the L-shaped configuration including the radially extending segment 92c of a low rigidity and the axially extending segment 92d of a high rigidity, strain concentration occurs in the vicinity of a corner 92e lying between the radially extending segment 92c and the axially extending segment 92d, but adjacent to the radially extending segment 92c, resulting in appearance of the larger strain than that in the outer member 1. In other words, the strain developing intermediate between the radially extending segment 92c and the axially extending segment 92d can be considered corresponding to the strain occurring in an R portion 1b at the root of the flange 1a, which has been transcribed and expanded. Since this strain is measured by the strain sensor 81, the strain occurring in the outer member 1 can be detected with high sensitivity and, hence, the strain measuring precision can be increased. Also, since using the axially acting strain so measured with high precision the axially acting force acting at the point of contact between the vehicle drive wheel 70 and the road surface is calculated, the axially acting force so calculated comes to be high in accuracy as well.

Figure 10:
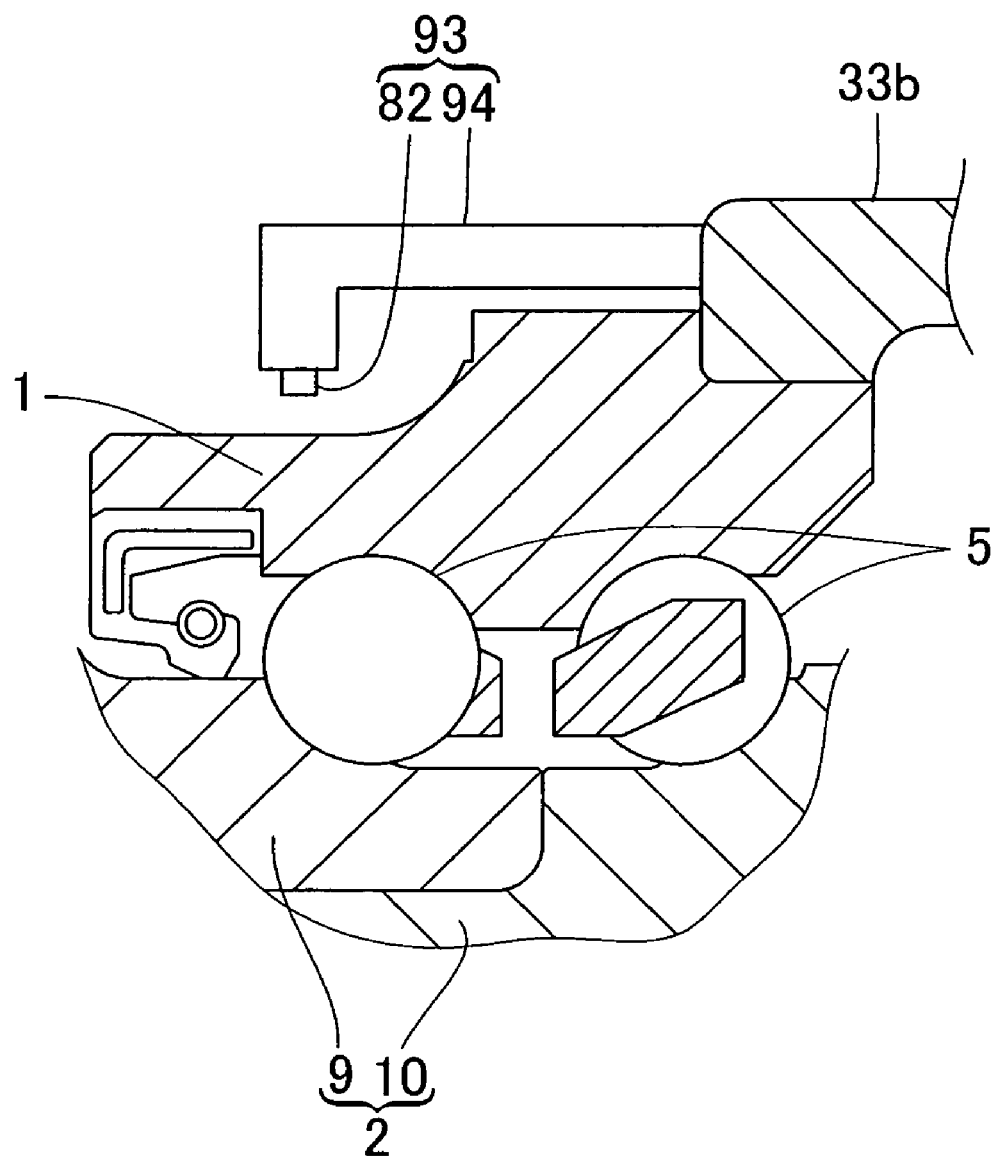
FIG. 10 is a sectional view showing the mounting of a radial strain sensor employed in the axle unit.
Figure 11:
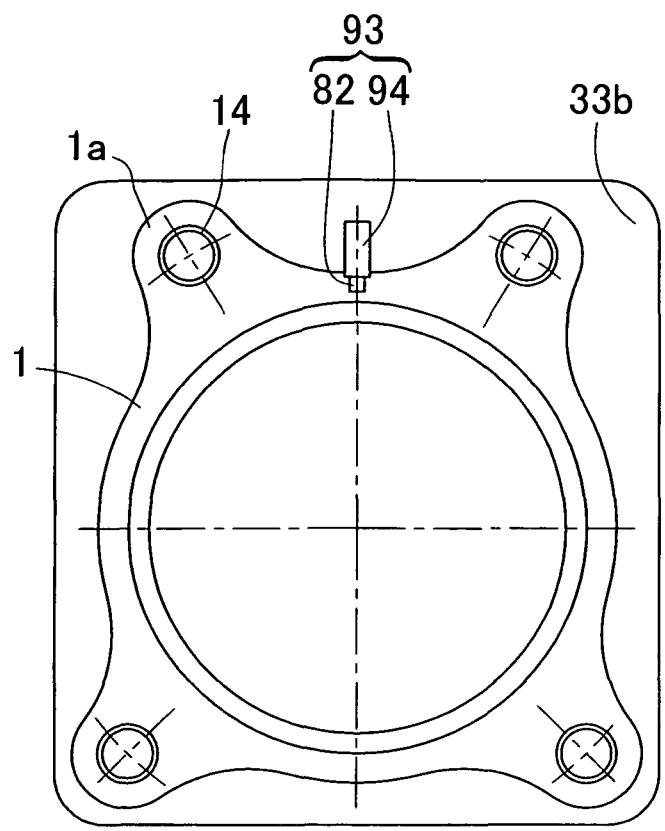
FIG. 11 is a front elevational view showing the outer member of the hub bearing assembly and the sensor unit for the radial strain sensor.
Figure 12A:
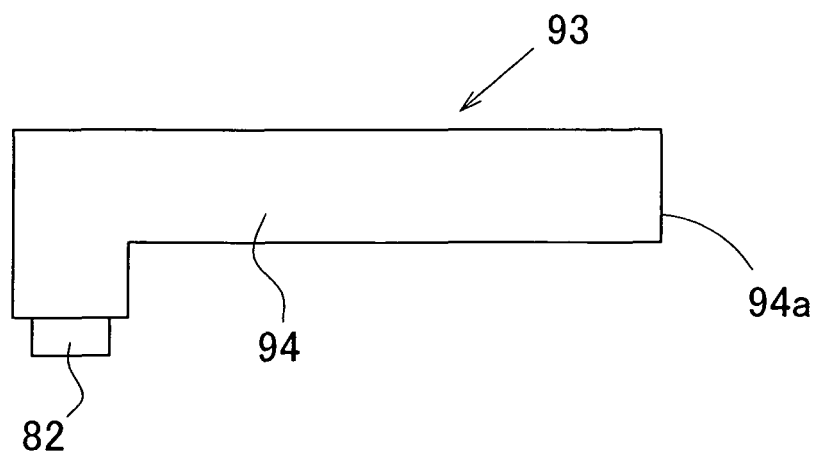
FIG. 12A is a side view showing the sensor unit.
Figure 12B:
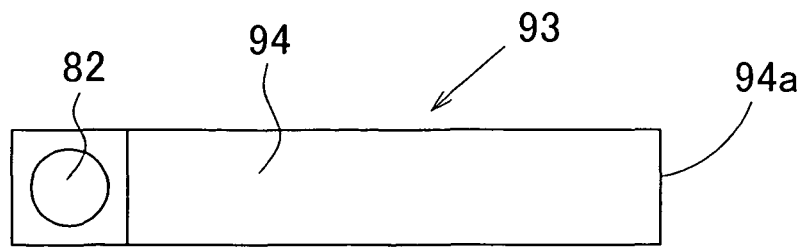
FIG. 12B is a bottom plan view showing the sensor unit.

The radial strain sensor 82 is so arranged as shown in FIGS. 10 to 12, for example. In other words, the radial strain sensor 82 is fitted to the sensor carrier member 94 to provide a sensor unit 93, which is in turn fixed to the outboard casing 33b of the reduction gear unit C. The sensor carrier member 94 is in the form of an elongated member having one end portion bent to represent a hook and the radial strain sensor 82 in the form of a displacement sensor is fitted to such one end of the sensor carrier member 94. A base end of the sensor carrier member 94 is formed as a contact fixing portion 94a adapted to be fitted to the casing 33b.

With the contact fixing portion 94a of the sensor carrier member 94 fixed to an outboard side surface of the casing 33b by means of a bonding material or the like, the sensor unit 93 is fitted to the casing 33b. In the case of the illustrated embodiment, the radial strain sensor 82 is employed in the form of, for example, a non-contact displacement sensor of an eddy current type and the radial strain sensor 82 is fitted to the sensor unit 93, having been spaced a predetermined gap from the outer peripheral surface of the outer member 1, so that displacement of the outer peripheral surface of the outer member in a direction radially thereof can be measured. The axially oriented position of the outer member 1 to which the radial strain sensor 82 is opposed is so chosen as to be, for example, in the vicinity of the rolling surface 3 of the outboard row or on an outboard side of the rolling surface 3. A portion of the outer member on the outboard side of the rolling surface 3 exhibits a relatively considerable deformation in the radial direction relative to the load as compared with that at any other portion of the outer member 1. The sensor carrier member 94 is made of a material having a rigidity sufficient to avoid deformation thereof under the influence of an external force when in a condition with the sensor unit 93 fitted to the casing 33b.

For the displacement sensor that can be employed as the radial strain sensor 82, any sensor such as, for example, an eddy current type, a magnetic type, an optical type, an ultrasonic type, a contact type or any other sensor capable of detecting the displacement can be employed. Accordingly, a suitable sensor should be selected in consideration of various conditions.

Since the sensor unit 93 including the sensor carrier member 94 and the radial strain sensor 82 fitted to such sensor carrier member 94 is so structured as to be fitted to the outer member 1, the sensor for the detection of a vertically acting load can be installed compactly. Since the sensor carrier member 94 is a simple component part that can be fitted to the outer member 1, fitting of the radial strain sensor 82 thereto makes it possible to render it to be excellent in mass production with the cost reduced.

When the load is applied to the inner member 2, which is a hub assembly for the vehicle drive wheel 70, by mean of the force acting vertical at the point of contact between the vehicle drive wheel 70 and the road surface, the outer member 1 undergoes deformation through the rolling elements 5 and a displacement of the outer member 1 in the radial direction thereof resulting from such deformation is measured by the radial strain sensor 82 provided in the sensor carrier member 94 fitted to the outboard casing 33b of the reduction gear unit C. At this time, since the outer peripheral surface of the outer member 1, which is an object to be measured, is a portion which displaces considerably in the radial direction as compared with that of any other surrounding thereof, the displacement of the outer member 1 in the radial direction can be measured with high sensitivity. Also, since using the radially acting strain so measured with high precision, the vertically acting force acting at the point of contact between the vehicle drive wheel 70 and the road surface is calculated, the vertically acting force so calculated comes to be high in accuracy as well.

In the embodiment described hereinbefore, the axial strain sensor 81 and the radial strain sensor 82 have been shown and described as used for measuring the strain occurring in the outer member 1 in the axial direction thereof and the strain occurring in the outer member 1 in the radial direction thereof, respectively. However, the axial strain sensor 81 and the radial strain sensor 82 may be used to measure, respectively, the axially and radial strains occurring in any other component part of the hub bearing assembly A, for example, the inner member 2.

Also, although in the foregoing embodiment the inner member has been shown and described as forming a hub bearing assembly of the third generation type, which forms a part of the hub assembly, it may be a hub bearing assembly of a first or second generation type in which the inner member and the hub assembly for the vehicle wheel are separate from and independent of each other. Also, it may be a hub bearing assembly A of a tapered roller bearing of any suitable generation type.

By way of example, where the axle unit of the present invention is provided on the automotive vehicle in association with each of the four vehicle wheels and those four vehicle wheels are independently driven by the respective electric motors B, an algorithm has to be established for detecting the rotational speed of each of those vehicle drive wheels 70 so that the vehicle attitude can be stabilized. In order to detect the rotational speed of each of the vehicle drive wheels 70, any method can be employed, in which, for example, a plurality of slits are provided on, or stripe shaped markings are depicted on, an outer diametric surface of the rotor 25 of the electric motor B and rays of light projected onto and subsequently reflected from the outer diametric surface of the rotor can be guided to the outside of the casing 22 through an optical fiber 86 so that the intensity of the reflected rays of light can be measured by a rotational speed sensor 87 which may be comprised of a light meter. Since the interior of the casing 22 of the electric motor B is sealed and is therefore less susceptible to contamination, measurement using light can be employed favorably. For the detection of the rotational speed of the vehicle drive wheel 70, a detecting method of an electromagnetic encoder system may be employed.

Since the axle unit of the present invention makes use of the brake assembly D in the form of an electric brake of a design, in which the brake pads 47 are driven by the electric motor 50, any possible environmental contamination, which would otherwise result from leakage of oil occurring in a hydraulic brake system, can be avoided. Also, because of the electric brake, the amount of movement of the brake pads 47 can be quickly adjusted and during the cornering the response to the control of the rotational speed of each of the left and right vehicle drive wheels 70 can be increased.

Also, the axle unit of the present invention is effective to increase the response to the suspension control to thereby stabilize the automotive vehicle attitude because the attenuating module 74 of the suspension system 73 is operated electrically.

Figure 13:
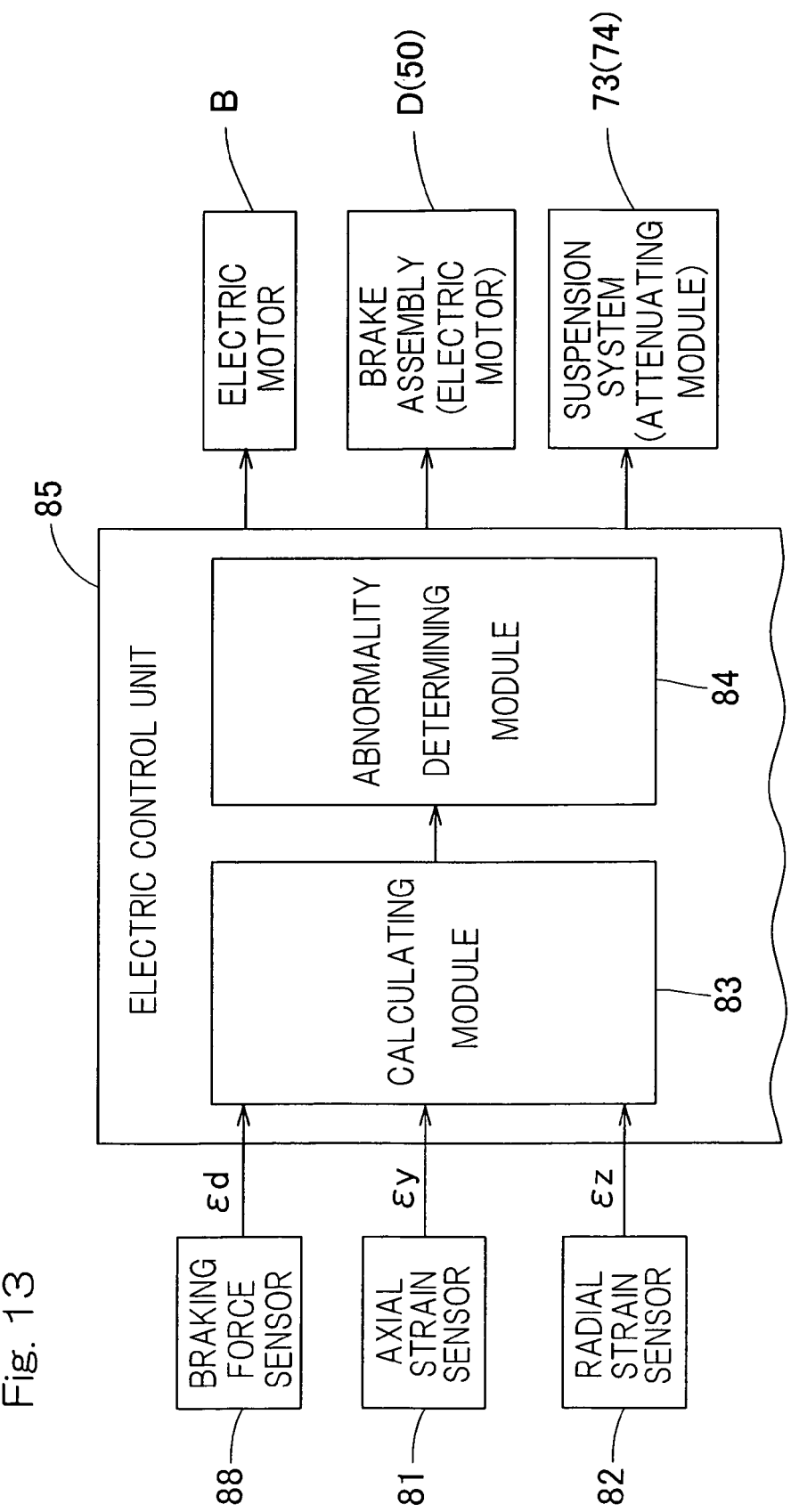
FIG. 13 is a block diagram showing another control system.

Although the control system employed in the foregoing embodiment has been shown and described as operable to determine the force Fx, which acts in the direction of travel of the automotive vehicle at the point of contact of the vehicle drive wheel 70 with the road surface, in reference to the output from the electric current sensor 80 for detecting the electric current I flowing across the electric motor B, such force Fx acting in the traveling direction may be determined in reference to an output from the braking force sensor 88 for detecting the braking force Ed applied to the brake pads 47 of the brake assembly D as shown in FIG. 13.

Considering that the magnitude of the braking force acting on the brake pads 47 of the brake assembly D varies depending on the magnitude of the force acting at the point of contact between the vehicle drive wheel and the road surface in the direction of travel of the automotive vehicle, if the relation between the working force and the braking force is determined by means of a series of experiments and/or simulations, the magnitude of the working force referred to above can be calculated. The calculating module 83 is operable to refer to the relation between the working force and the braking force, which has been determined by means of the experiments and/or simulations, to calculate, from the output of the electric motor 50, the force acting at the point of contact between the vehicle drive wheel and the road surface in the direction of travel of the automotive vehicle.

Figure 14:
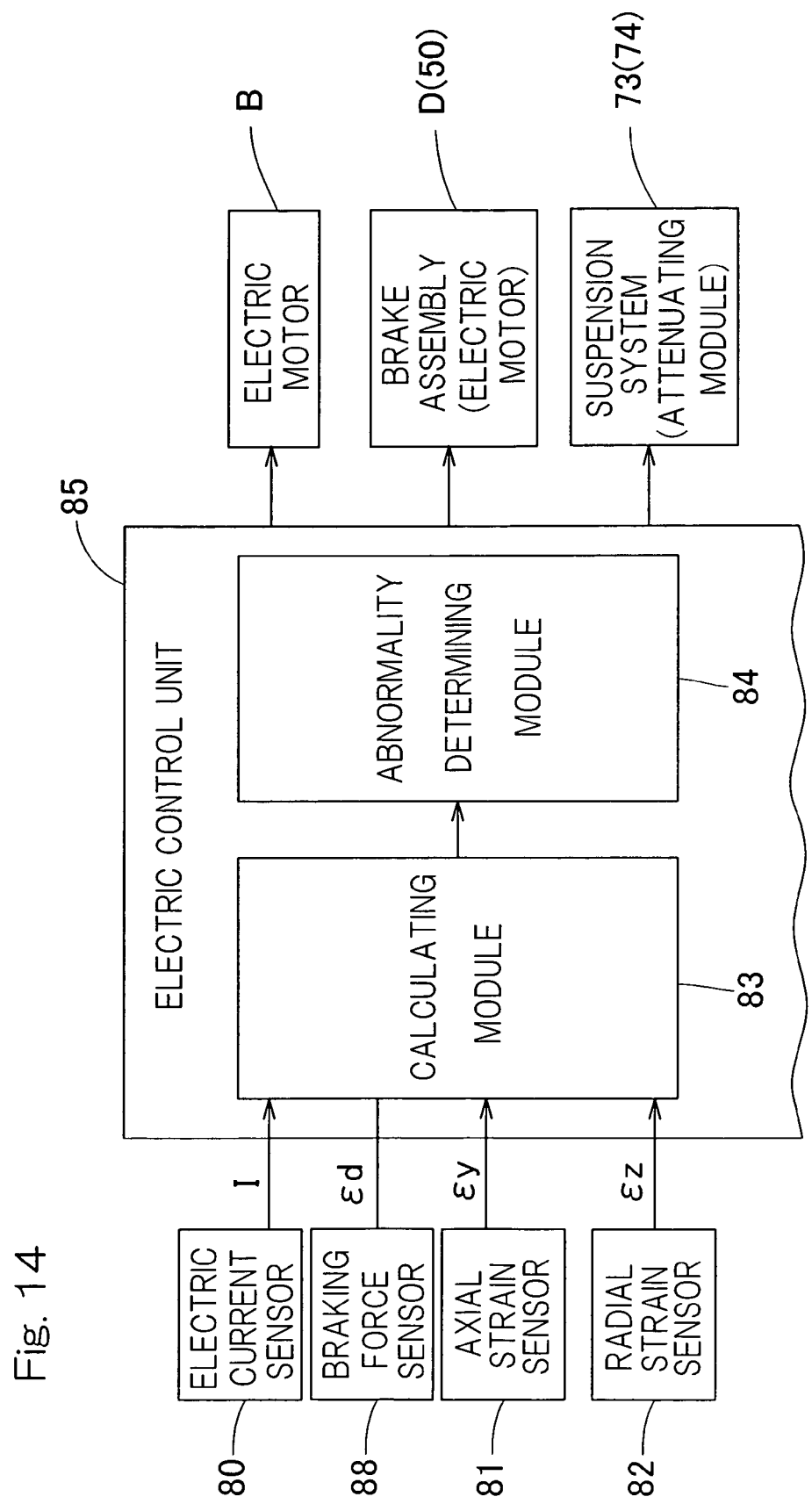
FIG. 14 is a block diagram showing a different control system.

In addition, as best shown in FIG. 14, if arrangement is made so that the force Fx acting in the travelling direction at the point of contact between the vehicle drive wheel 70 and the road surface can be determined by comparing the output of the electric current sensor 80 for detecting the electric current I flowing across the electric motor B with the output of the braking force sensor 88 for detecting the braking force Ed acting on the brake pads 47 of the brake assembly D, the accuracy of detection of the force Fx acting in the travelling direction can be increased.

Where the brake assembly D is of a hydraulically operated type, the force acting in the travelling direction at the point of contact between the vehicle drive wheel and the road surface may be determined by fitting a strain sensor to, for example, a brake caliper or any other member capable of being loaded when a pressing force is applied to the brake pads.

In the foregoing full description of the present invention, reference has been made to the use of the outputs from the sensors 80, 81 and 82 for detecting the forces acting in the three axis directions at the vehicle drive wheel 70 and the road surface to control the drive of the electric motor B, the operation of the brake assembly D and the operation of the suspension system 73, respectively. However, if a signal from a steering device is additionally used in those controls, it would be agreeable in achieving the control consistent with the actual travel.

Also, the axle unit of the present invention may be employed for each of all vehicle wheels employed in an automotive vehicle or for only one or some of those vehicle wheels.

What is claimed is:

1. A sensor equipped axle unit having an in-wheel type motor built therein, comprising:
   a train of component parts comprising a hub bearing assembly comprising an outboard segment supporting a vehicle driven wheel of an automotive vehicle fitted thereto, an electric motor, a reduction gear unit to reduce rotation of the electric motor and transmit it to the hub bearing assembly, and a brake assembly, the train of component parts all being arranged coaxially on a center axis of a vehicle drive wheel; and
   sensors to measure forces acting at a point of contact of the vehicle drive wheel and a road surface in three axis directions perpendicular to each other, respectively, from the status of at least one component part of the train of component parts,
   wherein the sensors comprise
      a braking force sensor to detect the braking force applied to brake pads of the brake assembly,
      an axial strain sensor to measure the axial strain acting on a stationary raceway ring of the hub bearing assembly, the axial strain sensor being fitted to the stationary raceway ring, and
      a radial strain sensor to measure the radial strain acting on a stationary raceway ring of the hub bearing assembly, the radial strain sensor being fitted to a casing of the reduction gear unit.

2. The sensor equipped axle unit having an in-wheel type motor built therein as claimed in claim 1, in which the brake assembly is an electric brake assembly.

3. The sensor equipped axle unit having an in-wheel type motor built therein as claimed in claim 1, in which the sensor equipped axle unit having an in-wheel type motor built therein is fitted to a vehicle body structure through a suspension system having an attenuating module for attenuating a force, acting at the point of contact between the vehicle drive wheel and the road surface and then transmitting it to the vehicle body structure, which module is electrically operated to change an attenuating degree, and a module for controlling the attenuating degree of the attenuating module, an output of the sensor being inputted to the attenuating degree controlling module.

4. The sensor equipped axle unit having an in-wheel type motor built therein as claimed in claim 1, in which as one of sensors to measure the respective forces acting in the three axis directions referred to above, an electric current sensor to measure a current value of the electric motor and a calculating module operable in response to an output of the electric current sensor to calculate the force acting at the point of contact between the vehicle drive wheel and the road surface in the direction of travel of the automotive vehicle are employed.

5. The sensor equipped axle unit having an in-wheel type motor built therein as claimed in claim 1, further comprising a calculating module to calculate, from an output of the braking force sensor, the force acting at the point of contact between the vehicle drive wheel and the road surface in the direction of travel of the automotive vehicle.

6. The sensor equipped axle unit having an in-wheel type motor built therein as claimed in claim 1, further comprising a calculating module to calculate, from an output of the axial strain sensor, the force acting at the point of contact between the vehicle drive wheel and the road surface in the axial direction of the vehicle drive wheel.

7. The sensor equipped axle unit having an in-wheel type motor built therein as claimed in claim 1, further comprising a calculating module to calculate, from an output of the radial strain sensor, the force acting at the point of contact between the vehicle drive wheel and the road surface in a vertical direction.

8. The sensor equipped axle unit having an in-wheel type motor built therein as claimed in claim 7, wherein the stationary raceway ring is fitted to the casing of the reduction gear unit.

9. The sensor equipped axle unit having an in-wheel type motor built therein as claimed in claim 1, wherein the electric motor is arranged on the inboard side of the reduction gear unit.

* * * * *